US012568425B2

(12) United States Patent
Ramamurthi et al.

(10) Patent No.: US 12,568,425 B2
(45) Date of Patent: Mar. 3, 2026

(54) MOBILE INTEGRATED ACCESS AND BACKHAUL (IAB) PHYSICAL CELL IDENTIFIER (PCI) MANAGEMENT

(71) Applicant: Verizon Patent and Licensing Inc., Basking Ridge, NJ (US)

(72) Inventors: Vishwanath Ramamurthi, San Ramon, CA (US); Arda Aksu, Lafayette, CA (US); Wei David Huang, Danville, CA (US); Parvez Ahmad, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 599 days.

(21) Appl. No.: 18/053,805

(22) Filed: Nov. 9, 2022

(65) Prior Publication Data

US 2024/0155469 A1      May 9, 2024

(51) Int. Cl.
*H04W 48/16* (2009.01)
*H04W 24/08* (2009.01)
*H04W 40/24* (2009.01)

(52) U.S. Cl.
CPC ........... *H04W 48/16* (2013.01); *H04W 24/08* (2013.01); *H04W 40/248* (2013.01)

(58) Field of Classification Search
None
See application file for complete search history.

(56) References Cited

U.S. PATENT DOCUMENTS

| | | | | |
|---|---|---|---|---|
| 2010/0020710 A1* | 1/2010 | Gupta | ................. | H04W 72/542 |
| | | | | 370/252 |
| 2021/0044370 A1* | 2/2021 | Abedini | ................ | H04W 16/10 |
| 2021/0045170 A1* | 2/2021 | Luo | ....................... | H04W 24/02 |
| 2021/0058835 A1* | 2/2021 | Luo | ....................... | H04L 5/0035 |
| 2021/0058854 A1* | 2/2021 | Luo | ....................... | H04W 88/08 |
| 2021/0352491 A1* | 11/2021 | Macmullan | ........... | H04W 16/14 |
| 2023/0262557 A1* | 8/2023 | Zhu | ...................... | H04W 36/087 |
| | | | | 455/436 |
| 2024/0155469 A1* | 5/2024 | Ramamurthi | ......... | H04W 40/22 |
| 2024/0251031 A1* | 7/2024 | Bakker | ................... | H04L 69/28 |

FOREIGN PATENT DOCUMENTS

| | | | | | |
|---|---|---|---|---|---|
| WO | WO-2014169945 A1 * | 10/2014 | ............ | H04W 24/02 |
| WO | WO-2018001649 A1 * | 1/2018 | ............ | H04W 16/02 |

* cited by examiner

*Primary Examiner* — Christopher T Wyllie

(57) ABSTRACT

A network device obtains a Physical Layer Cell Identifier (PCI) pool for allocating to ad-hoc mobile Integrated Access and Backhaul (IAB) nodes traversing a wireless network. The network device selects a first PCI for allocation to a first ad-hoc mobile IAB node located in the wireless network based on PCIs contained in the PCI pool, and allocates the first PCI to the first ad-hoc mobile IAB node. The network device pushes the allocated first PCI to the first ad-hoc mobile IAB node for use by the first ad-hoc mobile IAB node to establish User Equipment (UE) wireless access to the wireless network via wireless backhaul.

20 Claims, 10 Drawing Sheets

700 — Receive a PCI request associated with a Mobile IAB node

705 — Retrieve PCI, from a PCI reservation pool, that are reserved for Mobile IAB node use 710 — Select an unallocated PCI from the PCI reservation pool and allocates to the mobile IAB node 715 — Push the selected PCI to the Mobile IAB node

RAN
130

Cell
Sector 14

Cell
Sector 13

215-6
IAB node

Cell
Sector 12

215-5
IAB node

Cell
Sector 11

Cell
Sector 10

Cell
Sector 9

Cell
Sector 8

215-4
IAB node

Cell
Sector 7

215-2
IAB node

Mobile
IAB node
145

Cell
Sector 6

Cell
Sector 5

Cell
Sector 2

Cell
Sector 3

Cell
Sector 4

215-3

IAB node

Cell
Sector 1

215-1
IAB node known route of mobile
IAB node
900

MOBILE INTEGRATED ACCESS AND BACKHAUL (IAB) PHYSICAL CELL IDENTIFIER (PCI) MANAGEMENT

BACKGROUND

Next Generation mobile networks, such as Fifth Generation New Radio (5G NR) mobile networks, are expected to operate in various frequency ranges, including higher frequency ranges (e.g., in the gigahertz (GHz) frequency band), and to have a broad bandwidth (e.g., near 500-1,000 megahertz (MHz)). The expected bandwidth of Next Generation mobile networks is intended to support higher speed downloads. 5G mobile telecommunications networks may support more reliable, massive machine communications (e.g., machine-to-machine (M2M), Internet of Things (IoT)). Next Generation mobile networks are expected to enable a higher utilization capacity than current wireless networks, permitting a greater density of wireless users. Next Generation mobile networks are designed to increase data transfer rates, increase spectral efficiency, improve coverage, improve capacity, and reduce latency.

DETAILED DESCRIPTION OF EXAMPLE EMBODIMENTS

Figure 1:
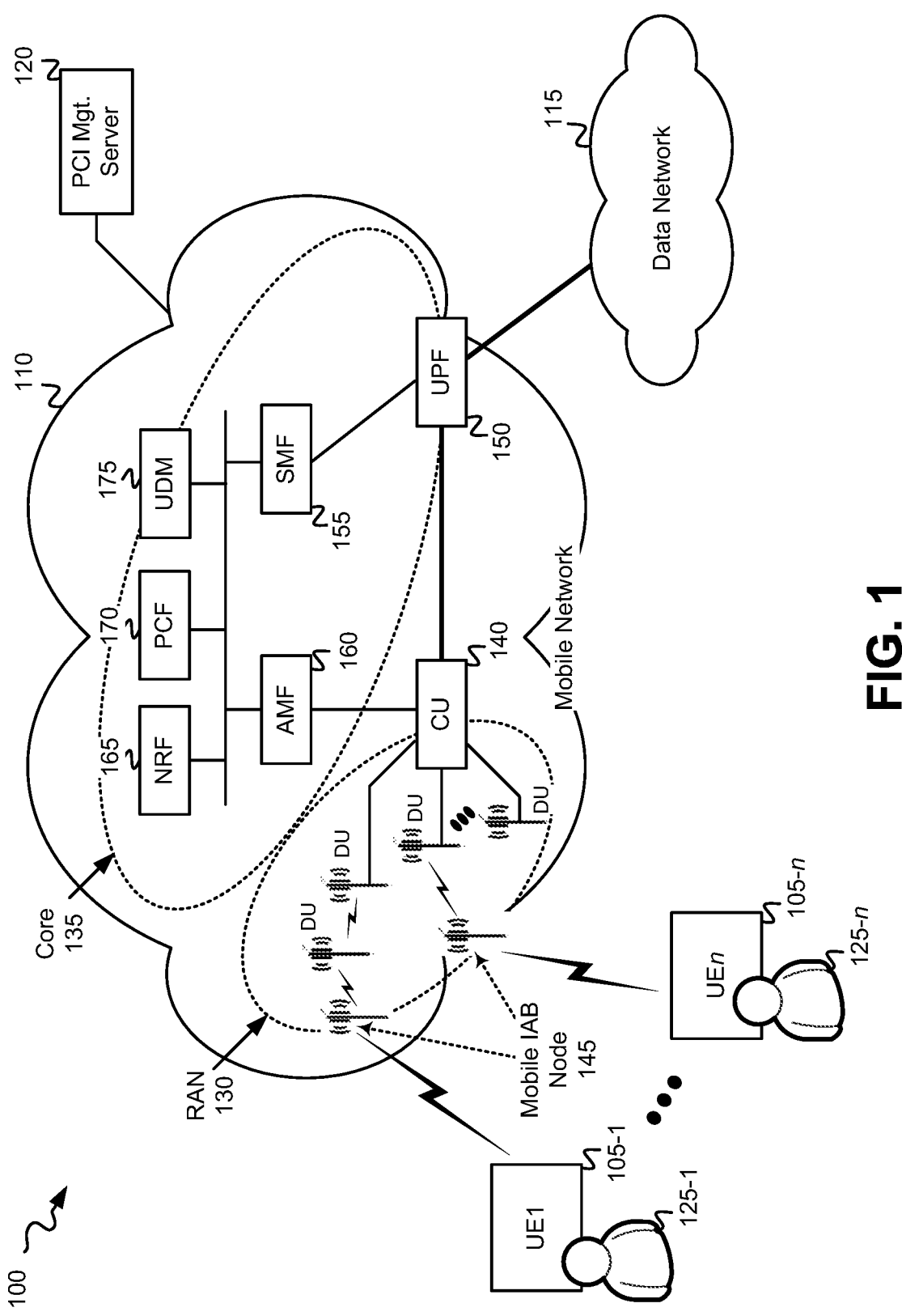
FIG. 1 depicts an exemplary network environment in which physical layer cell ID (PCI) management is performed for mobile Integrated Access and Backhaul (IAB) node use.

The following detailed description refers to the accompanying drawings. The same reference numbers in different drawings may identify the same or similar elements. The following detailed description does not limit the invention. Maximizing the potential of Next Generation networks, such as, for example, 5G networks, often requires fiber optic transport connectivity to each cell site within the networks. Installation of fiber optic cabling, however, can be costly and time consuming. Additionally, deployment of the small cells of Next Generation networks is challenging since these small cell deployments are typically occurring in densely populated areas already having large concentrations of installed fiber optic cabling. "Integrated Access and Backhaul" (IAB) is an alternative to fiber optic cable installation that uses 5G radio nodes (e.g., Distributed Units (DUs) of Next Generation NodeBs (gNBs)) to provide wireless backhaul communication between User Equipment devices (UEs) and the wireless network. "Wireless backhauling," as used herein, refers to use, by an IAB node, of one or more wireless channels for backhaul connectivity to other DUs or IAB nodes that enables upstream and downstream wireless communication of data traffic from/to UEs via the IAB node. In IAB, IAB nodes enable wireless backhaul communication to replace fiber optic cabling in certain areas of the wireless network.

Mobile IAB nodes involve IAB nodes that are ad-hoc and mobile in nature. A mobile IAB node may, in an ad-hoc fashion, power up at any location in the wireless network at any time, and then move from that location within the wireless network to other locations, all the while maintaining wireless backhaul communication between UEs and the wireless network, where the backhaul communication may involve one or more hops, across one or more mobile IAB nodes, and one or more other gNBs (e.g., IAB nodes and/or IAB donor nodes), from the UE to the wireless network. The backhaul communication may either connect directly to an IAB donor node or may connect indirectly to the IAB donor node through one or more IAB nodes. Each mobile IAB node 145 is mobile within mobile network 110 (i.e., not located at a fixed geographic location, but capable of moving to different geographic locations) and includes functionality for establishing an IAB backhaul connection(s) with an IAB node(s) or IAB donor DU(s).

Depending on the location and proximity of other gNBs, the mobile IAB node may need to self-configure some access settings, such as the physical layer cell ID (PCI), in a dynamic manner. The PCI is a cell or cell sector's identifier in Next Generation networks and may be required for downlink (DL) synchronization. PCI planning is an important component of 5G network planning and construction, and good PCI planning increases resource utilization and Quality of Service (QoS) for subscribers, whereas poor PCI planning results in PCI collisions or conflicts which negatively impact network performance.

Embodiments described herein manage PCIs for use by ad-hoc mobile IAB nodes that may appear anywhere within a Next Generation wireless network. Management of PCIs, as described herein, may involve dynamic, static, or semi-static PCI allocation processes. In a dynamic PCI allocation process described further below, a PCI management server may select and allocate a non-colliding PCI to a mobile IAB node, at certain times (e.g., mobile IAB node power-up, as the mobile IAB node moves within the mobile network) based on scanned PCIs and relative signal qualities, associated with neighboring cells and/or cell sectors, that have been reported by the mobile IAB node. In a static PCI allocation process described further below, a PCI management server may reserve a pool of PCIs for use by mobile IAB nodes, and a non-colliding PCI from this reservation pool may be selected and allocated to a mobile IAB node. In a semi-static PCI allocation process described below, a PCI management server identifies a known route of a mobile IAB node (e.g., a mobile IAB node mounted in/on a train or bus that repeatedly follows a known path), identifies PCIs of fixed IAB nodes along the known trajectory, and selects and allocates one or more non-colliding PCIs to the mobile IAB node for use at different points along the known route.

FIG. 1 depicts an example of a network environment 100 in which PCI management for mobile IAB node use is performed. As shown, network environment 100 may include UEs 105-1 through 105-n (generically referred to herein as a "UE 105" or "UEs 105"), a mobile network 110, a data network(s) 115, and a PCI Management Server 120.

UEs 105 may each include any type of device having a communication capability such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 125-1 is shown in association with UE 105-1 and a user 125-n is shown in association with UE 105-n. A user 125 may alternatively be referred to herein as a "subscriber 125."

Mobile network 110 (also referred to herein as a "mobile network 110," a "wireless network 110," or a "network 110") may include a Public Land Mobile Network (PLMN) and possibly one or more other networks (not shown) that provides wireless (e.g., Radio Frequency (RF)) communication with UEs 105. Mobile network 110 may be composed of sub-networks, such as a Radio Access Network (RAN) 130 and a core network 135. RAN 130 may include various types of radio access equipment that implement RF communication with UEs 105. The radio access equipment of RAN 130 may include, for example, multiple Distributed Units (DUs) (e.g., DUs, IAB nodes, or IAB donor DUs), at least one Centralized Unit (CU) 140, and one or more mobile IAB nodes 145. Though only a single CU 140 is shown in FIG. 1, RAN 130 may include multiple CUs 140, with each being connected to respective DUs.

Each CU 140 includes a network device that operates as a digital function unit that transmits digital baseband signals to the multiple DUs, and receives digital baseband signals from the multiple DUs. The DUs include network devices that operate as radio function units that transmit and receive RF signals to/from UEs 105 and which are located at fixed geographic positions within mobile network 110. CU 140 may interconnect with the DUs of RAN 130 via fronthaul links or a fronthaul network. Each of the DUs may include at least one antenna array, transceiver circuitry, and other hardware and software components for enabling the DUs to receive data via wireless RF signals from UEs 105, and to transmit wireless RF signals to UEs 105. Each fixed location DUs of the DUs shown in FIG. 1 may be an "IAB donor DU" or an "TAB node." An IAB donor DU includes functionality for providing New Radio (NR)-based wireless backhauling for TAB nodes and mobile TAB nodes. An TAB node is a DU that includes functionality for wirelessly backhauling to another TAB node or to an IAB donor DU. A mobile TAB node may, thus, connect to wireless network 110 via an TAB wireless backhaul connection to an TAB node or to an IAB donor DU.

In implementations in which mobile network 110 is a 5G network (such as shown in FIG. 1), a CU and one or more DUs may represent a distributed gNB, which may also be referred to herein as a "base station." The CU 140 and DUs may also represent an enhanced LTE (eLTE) eNB, also referred to herein as a "base station," that can connect to mobile network 110. Though only a single CU 140 and two mobile TAB nodes 145 are shown in FIG. 1, RAN 130 may include multiple CUs 140 and any number of mobile TAB nodes 145. RAN 130 may additionally include other nodes, functions, and/or components not shown in FIG. 1.

Each mobile TAB node 145 may include a DU that is mobile within mobile network 110 (i.e., not located at a fixed geographic location, but capable of moving to different geographic locations) and which includes functionality for establishing an TAB backhaul connection(s) with an TAB node(s) or an IAB donor DU(s). Each mobile TAB node 145 further includes functionality for decoding a broadcast channel(s) and acquiring mobile network information, attaching to a parent TAB node or IAB donor DU, and scanning neighboring cells/cell sectors to measure relative signal qualities of the cells/cell sectors, as described further below. Therefore, a "mobile TAB node," as referred to herein, includes a DU of a RAN that is mobile (i.e., moves through space), may be added, or removed, from the RAN in an ad-hoc fashion, and includes RF equipment (e.g., antenna(s) and/or antenna array(s), RF transmitter and receiver circuitry) for providing RF communication with UEs via one or more cells and/or cell sectors and for providing wireless IAB backhaul to an upstream IAB node or IAB donor DU.'

Core network 135 includes network devices that host and execute network functions (NFs) that operate the mobile network 110 including, among other NFs, mobile network access management, session management, and policy control NFs. In the exemplary network environment 100 of FIG. 1, core network 135 is shown as including a 5G mobile network that further includes 5G Network Functions (NFs), such as a User Plane Function (UPF) 150, a Session Management Function (SMF) 155, an Access and Mobility Management Function (AMF) 160, a Network Repository Function (NRF) 165, a Policy Control Function (PCF) 170, and a Unified Data Management (UDM) function 175. UPF 150, SMF 155, AMF 160, NRF 165, PCF 170, and UDM 175 may be implemented as virtual network functions (VNFs) within mobile network 110.

UPF 150 may act as a router and a gateway between mobile network 110 and data network 115, and forwards session data between data network 115 and RAN 130. Though only a single UPF 150 is shown in FIG. 1, mobile network 110 may include multiple UPFs 150 at various locations in network 110. SMF 155 performs session management, allocates network addresses to UEs 105, and selects and controls UPFs 150 for data transfer. AMF 160 performs authentication, authorization, and mobility management for UEs 105.

NRF 165 operates as a centralized repository of information regarding NFs in mobile network 110. NRF 165 enables NFs (e.g., UPF 150, SMF 155, AMF 160, UDM 175, PCF 170, UDM 175) to register and discover each other via an Application Programming interface (API). NRF 165 maintains an updated repository of information about the NFs available in mobile network 110, along with information about the services provided by each of the NFs. NRF 165 further enables the NFs to obtain updated status information of other NFs in mobile network 110. NRF 165 may, for example, maintain profiles of available NF instances and their supported services, allow NF instances to discover other NF instances in mobile network 110, and allow NF instances to track the status of other NF instances.

PCF 170 may provide policy rules for control plane functions (e.g., for network slicing, roaming, and/or mobility management) and may access user subscription information for policy decisions. UDM 175 manages data for user access authorization, user registration, and data network profiles. UDM 175 may include, or operate in conjunction with, a User Data Repository (UDR—not shown) which stores user data, such as customer profile information, customer authentication information, user-subscribed network slice information, and encryption keys.

Data network 115 may include one or more interconnected networks, such as local area networks (LANs), wide area networks (WANs), metropolitan area networks (MANs), and/or the Internet that are external to, and connected to, mobile network 110. Data network 115 may connect with UPF(s) 150 of mobile network 110. Data network 115 may include one or more network devices (e.g., a data center) that execute at least one application, and/or which provide server functions or network services.

PCI management server 120 includes one or more network devices that manage PCIs for mobile IAB nodes within mobile network 110, including selecting and allocating PCIs to different mobile IAB nodes that may be moving within the geographic coverage area of the mobile network 110. PCI management server 120 is shown in FIG. 1 as connecting to mobile network 110. PCI management server 120 may, in some implementations however, connect to data network 115 (and to mobile network 110 indirectly via data network 115). In some implementations, PCI management server 120 may be a component of mobile network 110 and may connect to core network 135 and/or to RAN 130. For example, PCI management server 120 may reside within mobile network 110, such as, for example, within core network 135 or RAN 130, and may connect directly to CU 140 and/or to RAN 130 (e.g., to one or more DUs, or other devices/nodes within RAN 130 not shown in FIG. 1).

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 135 may include other NFs not shown in FIG. 1. As a further example, though mobile network 110 is depicted in FIG. 1 as a 5G network having 5G network components/functions, mobile network 110 may alternatively include a 4G or 4.5G network with corresponding network components/functions, or a hybrid 5G/4G network that includes certain components of both a Next Generation network (e.g., a 5G network) and a 4G Long Term Evolution (LTE) network. Mobile network 110 may alternatively include another type of Next Generation network, other than the 5G network shown in FIG. 1. Additionally, though only a single instance of each of the NFs UPF 150, SMF 155, AMF 160, NRF 165, PCF 170, and UDM 175 is shown in FIG. 1, mobile network 110 may include multiple instances of each of these NFs. For example, if mobile network 110 implements network slicing, then each of the configured network slices may include its own SMF 155, PCF 170, and UPF 150. Each of the NFs described above may be installed in, and be executed by, a network device residing in mobile network 110, or in another network (e.g., in an edge or a far edge network, not shown). A single network device may host and execute one or more of the NFs described above, and mobile network 110 may include at least one network device, or may have multiple (e.g., numerous) network devices.

Figure 2:
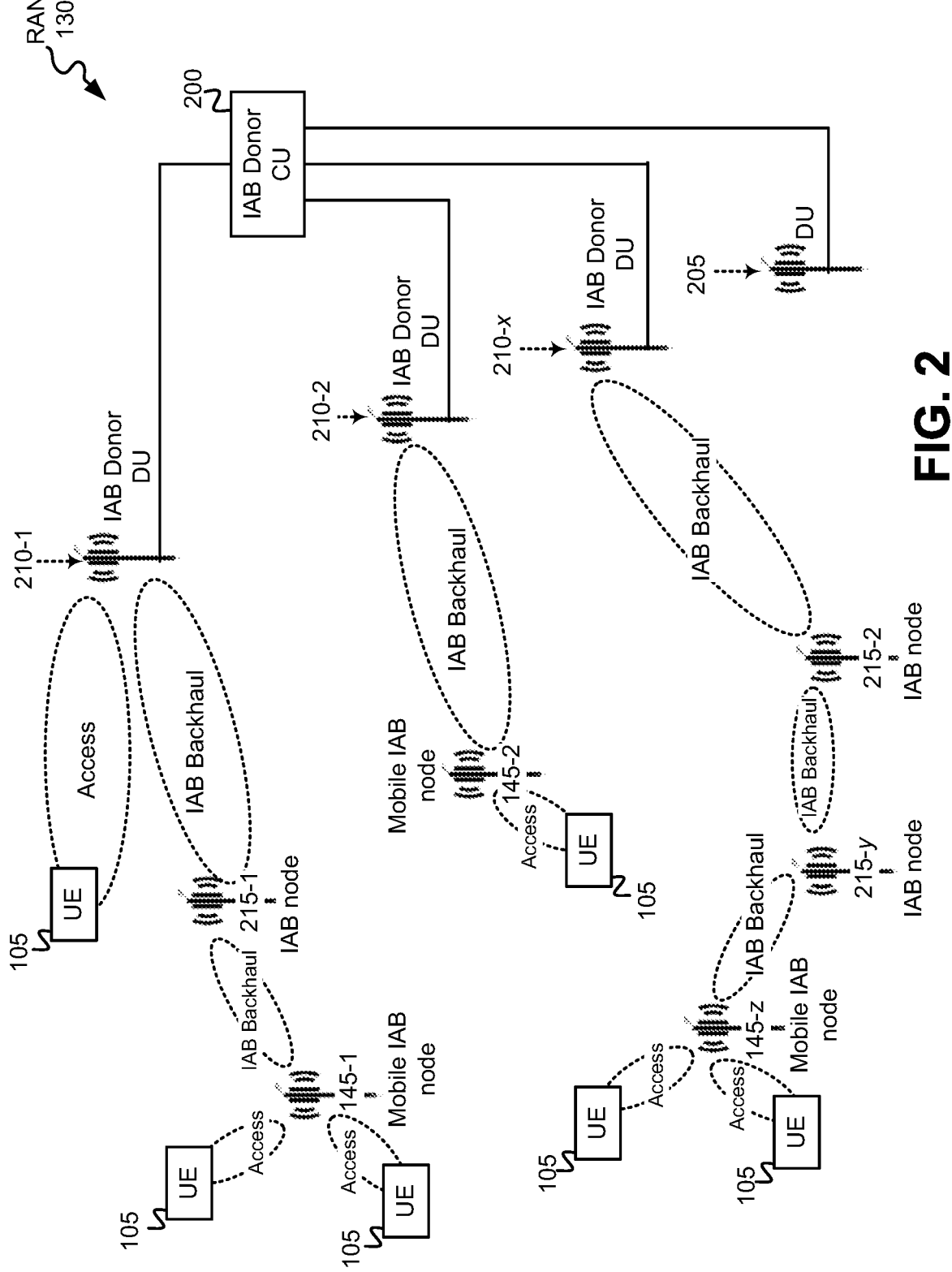
FIG. 2 illustrates an example of a Radio Access Network (RAN) of a mobile network in which multiple mobile IAB nodes are deployed at various geographic locations within the mobile network.

FIG. 2 illustrates an example of RAN 130 of mobile network 110 in which multiple mobile IAB nodes 145 are deployed at various geographic locations within the mobile network 110. As shown, RAN 130 may include an IAB donor CU 200, a DU 205, multiple IAB donor DUs 210-1 through 210-x, IAB nodes 215-1 through 215-y, and mobile IAB nodes 145-1 through 145-z.

IAB donor CU 200 includes a network device that, in addition to standard CU functions, includes functions for controlling and managing the IAB backhauls used to connect the IAB nodes 215-1 through 215-y and mobile IAB nodes 145-1 through 145-z. An "IAB backhaul," as referred to herein, includes one or more wireless channels that permit upstream and downstream communication of data traffic via an IAB node (e.g., a fixed IAB node or a mobile IAB node) to/from RAN 130 of mobile network 110. IAB donor CU 200, in the case of Next Generation networks, may include a gNB that controls and manages the provision of network access to UEs 105 via a network of backhaul and access links, such as via IAB nodes or mobile IAB nodes.

DU 205 includes a network device that performs standard DU functions within mobile network 110 and may provide wireless access communication with UEs 105 (not shown). Each of IAB donor DUs 210-1 through 210-x (generically referred to herein as "IAB donor DU 210") includes a network device that provides network access to UEs 105 via a network of backhaul and access links (e.g., via IAB nodes and/or mobile IAB nodes). IAB donor DU 210 may, in addition to standard DU functionality, include functionality for providing wireless backhaul connectivity between IAB nodes or mobile IAB nodes and other nodes of RAN 130 of mobile network 110. IAB donor DUs 210 may have fixed locations within RAN 130 of mobile network 110.

Each of mobile IAB nodes 145-1 through 145-z (generically referred to herein as "mobile IAB node 145") includes a network device that may be added, in an ad-hoc fashion, at any location within the RAN 130 of the mobile network 110. Each mobile IAB node 145 may further, once powered up at a location, move within the RAN 130 (i.e., move geographically relative to other IAB nodes, DUs, or IAB donor DUs within RAN 130) or move across different CUs 140 with the RAN 130.

Mobile IAB node 145-1, operating as a mobile DU, may establish multiple access cells/cell sectors for communication with UEs 105, and may route those communications through IAB node 215-1 and IAB donor DU 210-1, via the IAB backhauls, to the mobile core network 135 (not shown). In the example shown in FIG. 2, mobile IAB node 145-1 connects to parent IAB node 215-1 via an IAB backhaul and parent IAB node 215-1 further connects to IAB donor DU 210-1 via an IAB backhaul.

Mobile IAB node 145-2, operating as a mobile DU, may establish one or more access cells/cell sectors for communication with UEs 105, and may route those communications through IAB donor node 210-2, via the IAB backhaul, to the mobile core network 135 (not shown). Mobile IAB node 145-2 connects to IAB donor DU 210-2 via an IAB backhaul.

Mobile IAB node 145-z, operating as a mobile DU, may establish one or more access cells/cell sectors for communication with UEs 105, and may route those communications through parent IAB node 215-y, IAB node 215-2, and IAB donor DU 210-x, via the IAB backhauls, to the mobile core network 135 (not shown). In the example shown in FIG. 2, mobile IAB node 145-z connects to parent IAB node 215-y via an IAB backhaul, parent IAB node 215-y connects to IAB node 215-2 via an IAB backhaul, and IAB node 215-2 connects to IAB donor DU 210-x, via an IAB backhaul, to the mobile core network 135 (not shown).

Each of IAB nodes 215-1 through 215-*y* (generically referred to herein as "IAB node 215") includes a network device that connects upstream to another IAB node 215 or to an IAB donor DU 210 via one or more wireless backhaul channels. Each IAB node 215, therefore, provides wireless backhaul connectivity from downstream IAB nodes 215, and also may provide wireless access to UEs 105. IAB nodes 215 may have fixed locations within RAN 130 of mobile network 110.

FIG. 2 illustrates only a single example of the deployment of multiple mobile IAB nodes 145 within one example of a RAN 130. Mobile IAB nodes 145 may be deployed in RAN 130's having a different configuration than that shown in the example of FIG. 2. For example, a RAN 130 may have a different number and arrangement of IAB donor DUs 210, DUs 205, IAB nodes 215, and mobile IAB nodes 145 than shown in FIG. 2.

Figure 3:
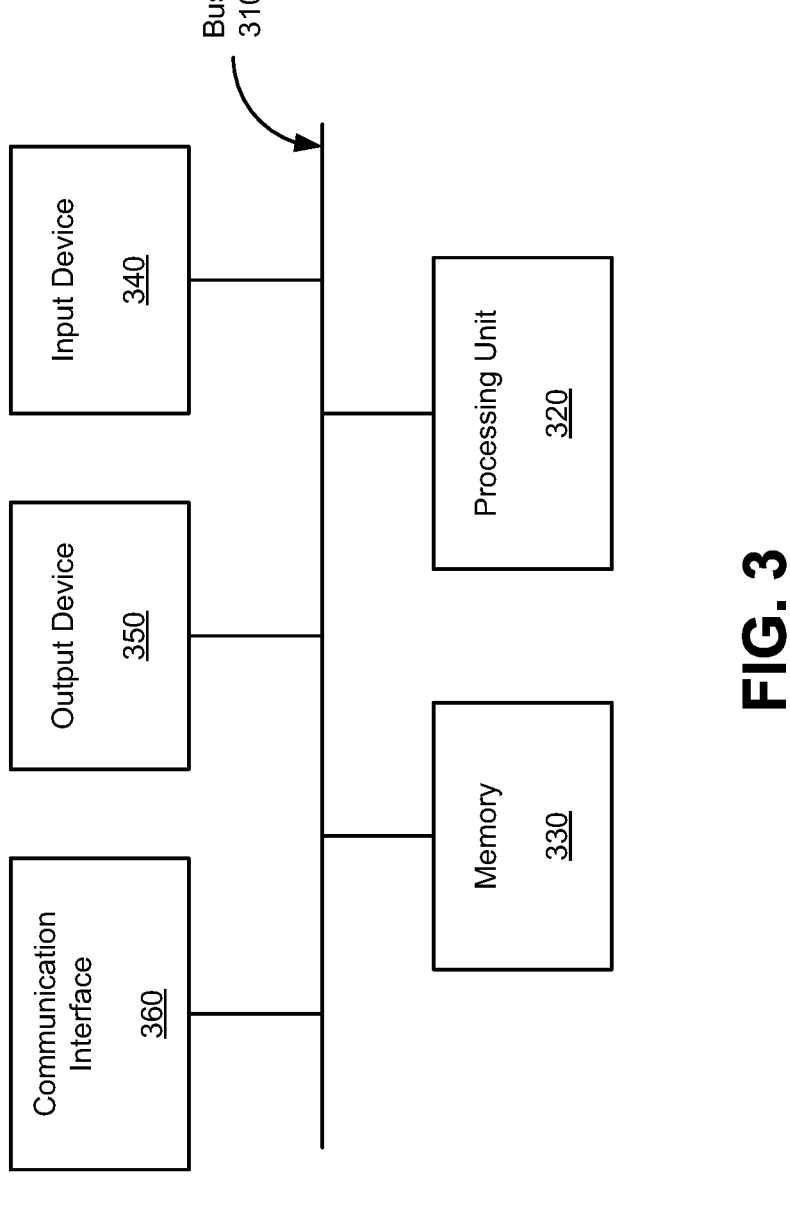
FIG. 3 depicts exemplary components of a network device that may correspond to various devices described herein.

FIG. 3 is a diagram that depicts exemplary components of a network device 300 (referred to herein as a "network device" or a "device"). UEs 105, CUs 140, DUs 205, IAB donor DUs 210, IAB nodes 215, and mobile IAB nodes 145 may include one or more components that are the same as, or similar to, those of device 300 shown in FIG. 3. Furthermore, PCI management server 120 and each of the NFs UPF 150, SMF 155, AMF 160, NRF 165, PCF 170, and UDM 175 may be implemented by a network device that includes one or more components that are the same as, or similar to, those of device 300. Some of the NFs may be implemented by a same device 300 within mobile network 110, while others of the functions may be implemented by one or more separate devices 300 within mobile network 110.

Device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors which may interpret and execute instructions, or processing logic. Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via mobile network 110 and/or data network 115. In the case of DUs of RAN 130 (e.g., IAB donor DUs 210, IAB nodes 215, mobile IAB nodes 145), communication interface 360 may further include one or more antenna arrays for producing radio frequency (RF) cells or cell sectors for UE access and/or IAB backhaul.

The configuration of components of network device 300 illustrated in FIG. 3 is for illustrative purposes. Other configurations may be implemented. Therefore, network device 300 may include additional, fewer and/or different components, that may be arranged in a different configuration, than depicted in FIG. 3.

Figure 4:
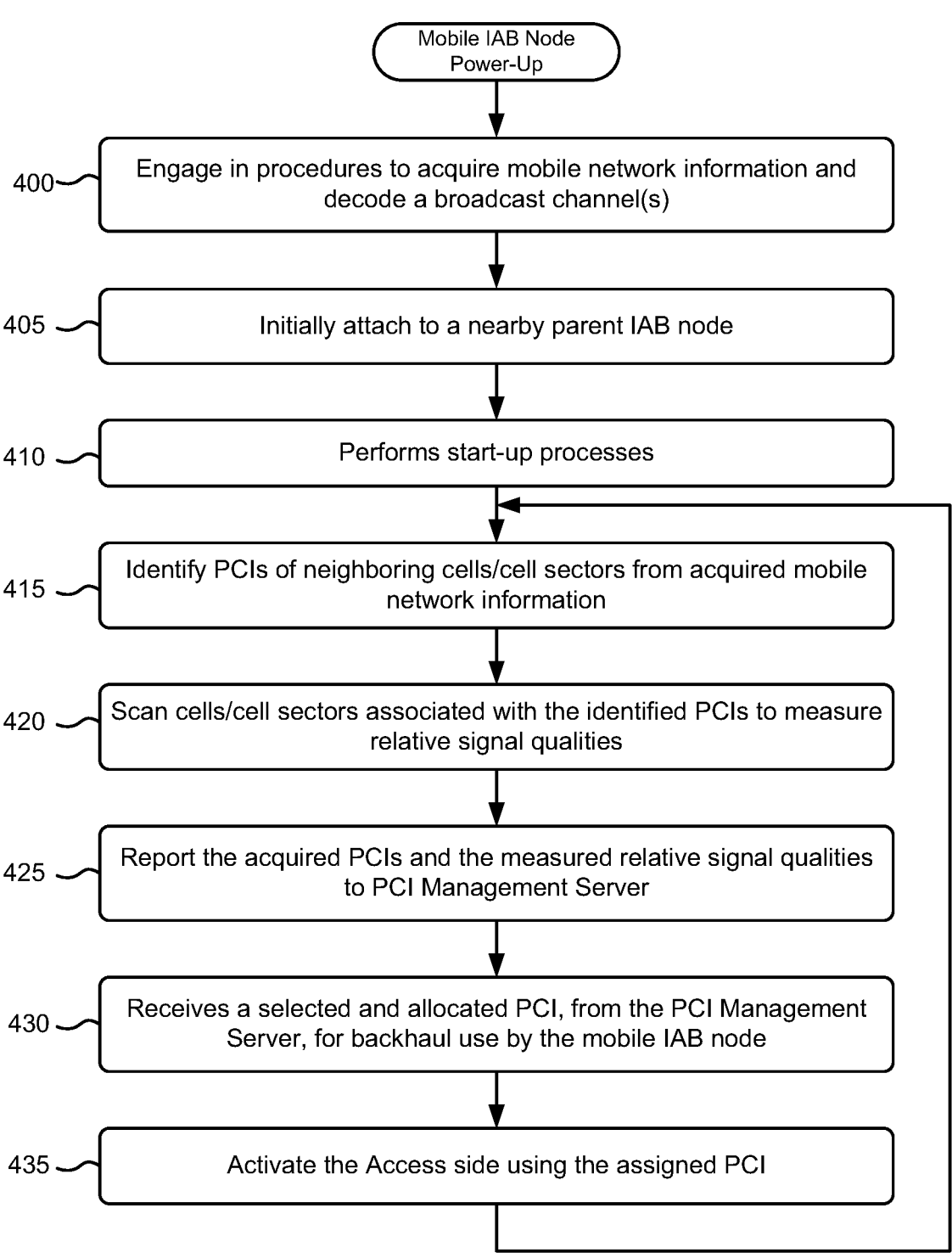
FIG. 4 is a flow diagram of an example process for a mobile IAB node to obtain a PCI for use in providing wireless backhaul from the mobile IAB node to another IAB node or an IAB donor Distributed Unit (DU)

FIG. 4 is a flow diagram of an example process for a mobile IAB node 145 to obtain a PCI from PCI management server 120 for use in providing wireless backhaul from the mobile IAB node 145 to another IAB node or to a IAB donor DU. The example process of FIG. 4 may be implemented by a mobile IAB node 145, in conjunction with PCI management server 120. The example process of FIG. 4 may be executed subsequent to a mobile IAB node 145 powering up at a particular geographic location within a coverage area of RAN 130. The example process of FIG. 4 may, either in whole or in part, be repeated by mobile IAB node 145 as mobile IAB node moves within RAN 130 (i.e., traverses from one geographic location to another). The example process of FIG. 4 is described with additional reference to FIG. 5.

The example process includes a mobile IAB node 145 engaging in procedures to acquire mobile network information and to decode a broadcast channel(s) in mobile network 110 (block 400) and initially attaches to a nearby parent IAB node 215 (block 405). Mobile IAB node 145 engages in standard initial procedures for obtaining mobile network information and for setting up a connection with a base station (e.g., a nearby gNB such as an IAB donor DU 210 or IAB node 215), such as, for example, using the Physical Random Access Channel (PRACH), and/or other mobile network channels to establish a connection to one of the nearby IAB donor DUs 210 or IAB nodes 215 that is associated with one of the neighboring cell sectors.

Mobile IAB node 145 performs start-up processes (block 410). The start-up processes may include, for example, contacting a File Transfer Protocol (FTP) server to check for software updates, performing new software downloads, and performing a device reset if new software has been downloaded. Mobile IAB node 145 identifies PCIs of neighboring cells and/or cell sectors from the acquired mobile network information (block 415) and scans the cells and/or cell sectors associated with the identified PCIs to measure relative signal qualities (block 420). The mobile IAB node 145 identifies the PCI associated with the parent node (e.g., IAB donor DU 210 or IAB node 215) to which it has initially connected and the PCIs of the neighboring IAB donor DUs 210 and/or IAB nodes 215. The mobile IAB node 145 additionally measures the relative signal quality of the cell/cell sector associated with the PCI of the parent node and the relative signal qualities of the cell/cell sector of each of the other neighboring IAB donor DUs 210 and/or IAB nodes 215.

Figure 5:
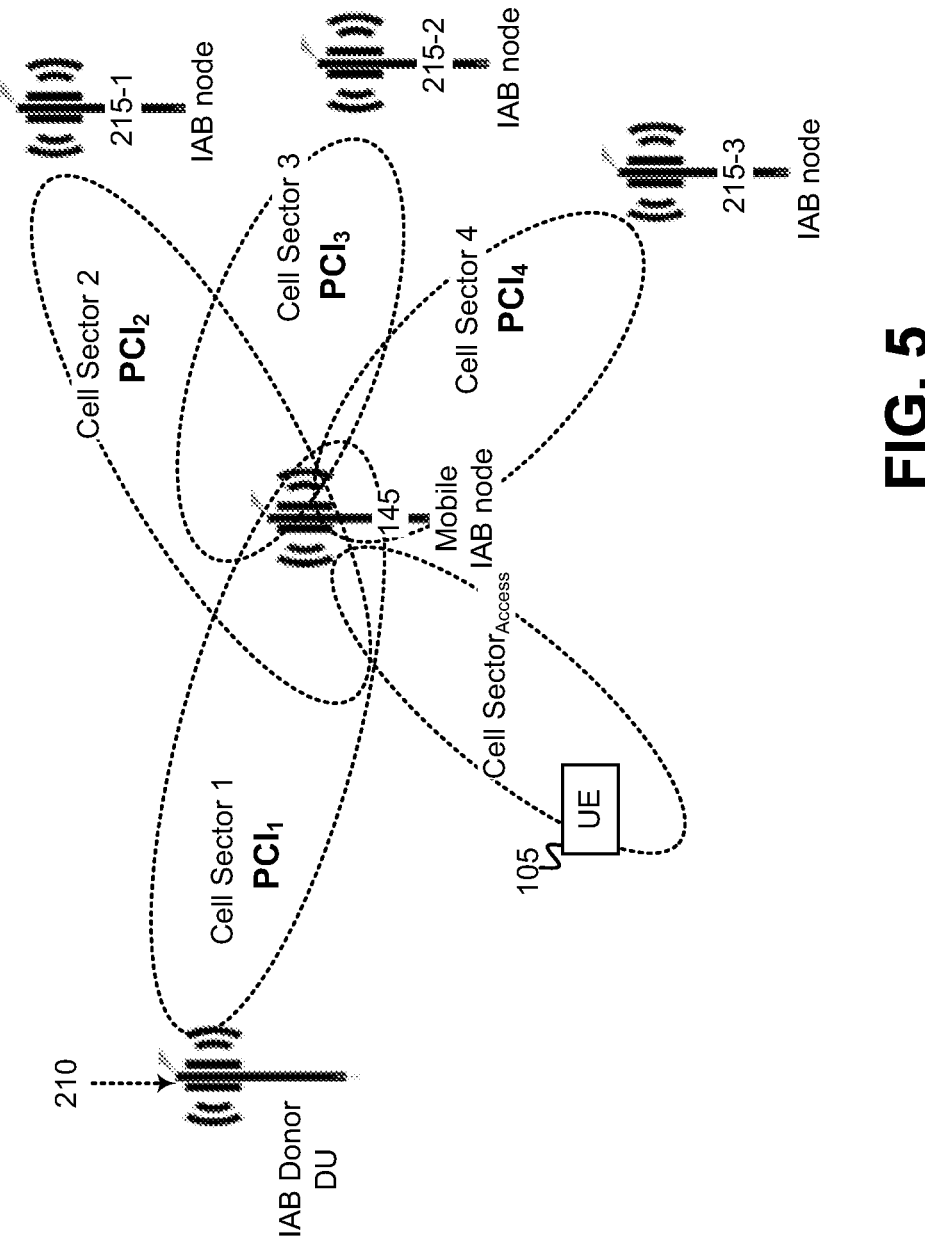
FIG. 5 depicts an example of cell sectors that neighbor a mobile IAB node.

Referring to the example of FIG. 5, mobile IAB node 145 may scan and acquire PCIs of IAB donor DU 210 and IAB nodes 215-1 through 215-3 having cell sectors whose coverage area extends to a current location of mobile IAB node 145. For example, mobile IAB node 145 scans and acquires the PCI (PCI₁) of cell sector 1 of neighboring IAB donor DU 210, where cell sector 1's coverage extends to the current location of mobile IAB node 145

Further, mobile IAB node 145 scans and acquires the PCI (PCI$_2$) of cell sector 2 of neighboring IAB node 215-1, where cell sector 2's coverage area extends to the current location of mobile IAB node 145. Additionally, mobile IAB node 145 scans and acquires the PCI (PCI$_3$) of cell sector 3 of neighboring IAB node 215-2, where cell sector 3's coverage area extends to the current location of mobile IAB node 145. Also, mobile IAB node 145 scans and acquires the PCI (PCI$_4$) of cell sector 4 of neighboring IAB node 215-3, where cell sector 4's coverage area extends to the current location of mobile IAB node 145. Mobile IAB node 145 may additionally measure the relative signal quality of each of cell sectors 1-4, and obtain Neighbor Lists (NLs) for each of IAB donor DU 210 and IAB nodes 215-1 through 215-3. The NLs list each IAB donor DU 210 and/or IAB node 215 that is determined to be a neighbor to a given IAB donor DU 210 or IAB node 215. For example, referring to FIG. 5, a NL for IAB node 215-2 may identify each of IAB nodes 215-1 and 215-3.

Mobile IAB node 145 reports the acquired PCIs and the measured relative signal qualities to PCI management server 120 (block 425). Mobile IAB node 145 may, for example, generate a list that identifies each IAB donor DU 210 and/or each IAB node 215, the PCI(s) associated with one or more cells/cell sectors of each IAB donor DU 210 and/or IAB node 215, and the measured relative signal quality associated with each PCI and corresponding cell/cell sector. Mobile IAB node 145 may send the generated list to PCI management server 120 via the parent node of mobile IAB node 145.

Mobile IAB node 145 receives a selected and allocated PCI, from PCI management server 120, for backhaul use by the mobile IAB node (block 430) and activates the access side using the assigned PCI (block 435). In response to the list containing the PCIs and measured relative signal qualities of neighboring IAB donor DUs 210 and/or IAB nodes 215, PCI management server 120 selects and allocates, as described with respect to the example process of FIGS. 6A and 6B below, a PCI, that doesn't collide with PCIs of other IAB donor DUs 210 and IAB nodes 215 in the vicinity of mobile IAB node 145, for use by mobile IAB node 145 in providing an IAB backhaul for UE access to mobile network 110. Referring to FIG. 5, mobile IAB node 145 may be allocated PCI$_2$, associated with cell sector 2 of IAB node 215-1, for providing the IAB backhaul between mobile IAB node 145 and IAB node 215-1. In this example, data traffic received from UE 105 via mobile IAB node 145's cell sector (cell sector$_{access}$) may be sent via the IAB backhaul (e.g., cell sector 2 of IAB node 215-1) associated with allocated PCI$_2$ towards the mobile network 110 in an upstream direction. In a downstream direction, data traffic received from IAB node 215-1, via the IAB backhaul (e.g., cell sector 2 of IAB node 215-2) associated with allocated PCI$_2$, may be transmitted by mobile IAB node 145 via mobile IAB node 145's cell sector (cell sector$_{access}$) to the destination UE 105.

Blocks 415-430 may be repeated (e.g., periodically) to update the PCIs of current neighboring cells/cell sectors, and possibly re-select a PCI for UE access use by mobile IAB node 145, as mobile IAB node 145 moves from one geographic location to another geographic location. If a reservation pool of PCIs is used for selecting and allocating a PCI to mobile IAB node 145, such as described with respect to the example process of FIG. 7, blocks 415-425 may be omitted and, instead of reporting the acquired PCIs from neighboring cells/cell sectors (e.g., block 425), then mobile IAB node 145, or another node in RAN 130 on behalf of mobile IAB node 145, may send a PCI request to PCI management server 120. Upon receipt of the PCI request, PCI management server 120 may perform blocks 700-715 of FIG. 7 to select and allocate a PCI to the mobile IAB node 145.

Alternatively, if a known route of the mobile IAB node 145 is taken into account when selecting and allocating a PCI(s) to the mobile IAB node 145, such as described with respect to the example process of FIG. 8 below, blocks 415-425 may be omitted and, instead of reporting the acquired PCIs from neighboring cells/cell sectors (e.g., block 425), then mobile IAB node 145, or another node in RAN 130 on behalf of mobile IAB node 145, may send a PCI request to PCI management server 120. Upon receipt of the PCI request, PCI management server 120 may perform blocks 800-825 of FIG. 8 to select and allocate PCIs for use by the mobile IAB node 145.

Figure 6A:
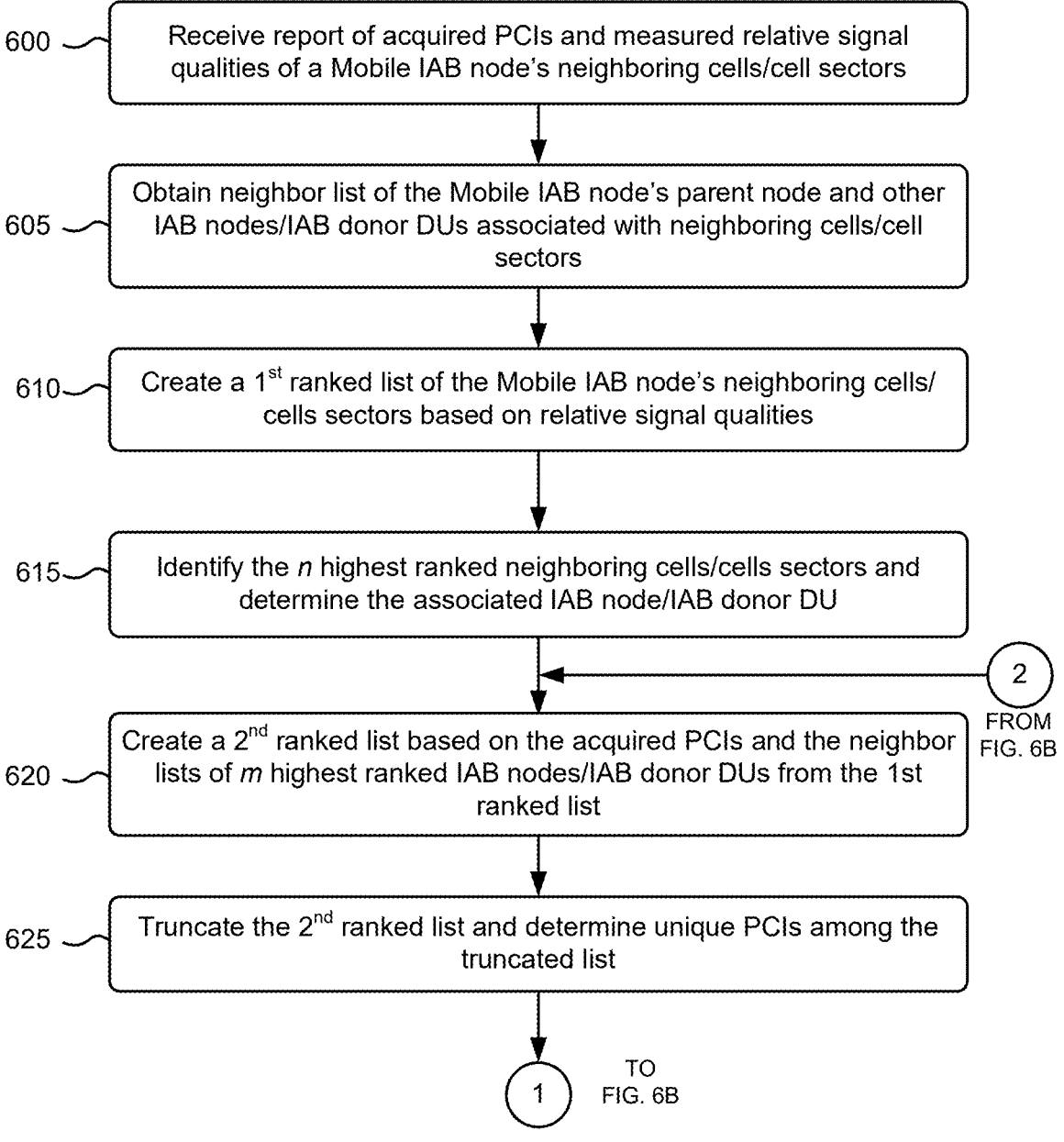
FIGS. 6A and 6B are flow diagrams of an example process for selecting and allocating a non-colliding PCI to a mobile IAB node that may be moving from one geographic location to another geographic location.
Figure 6B:
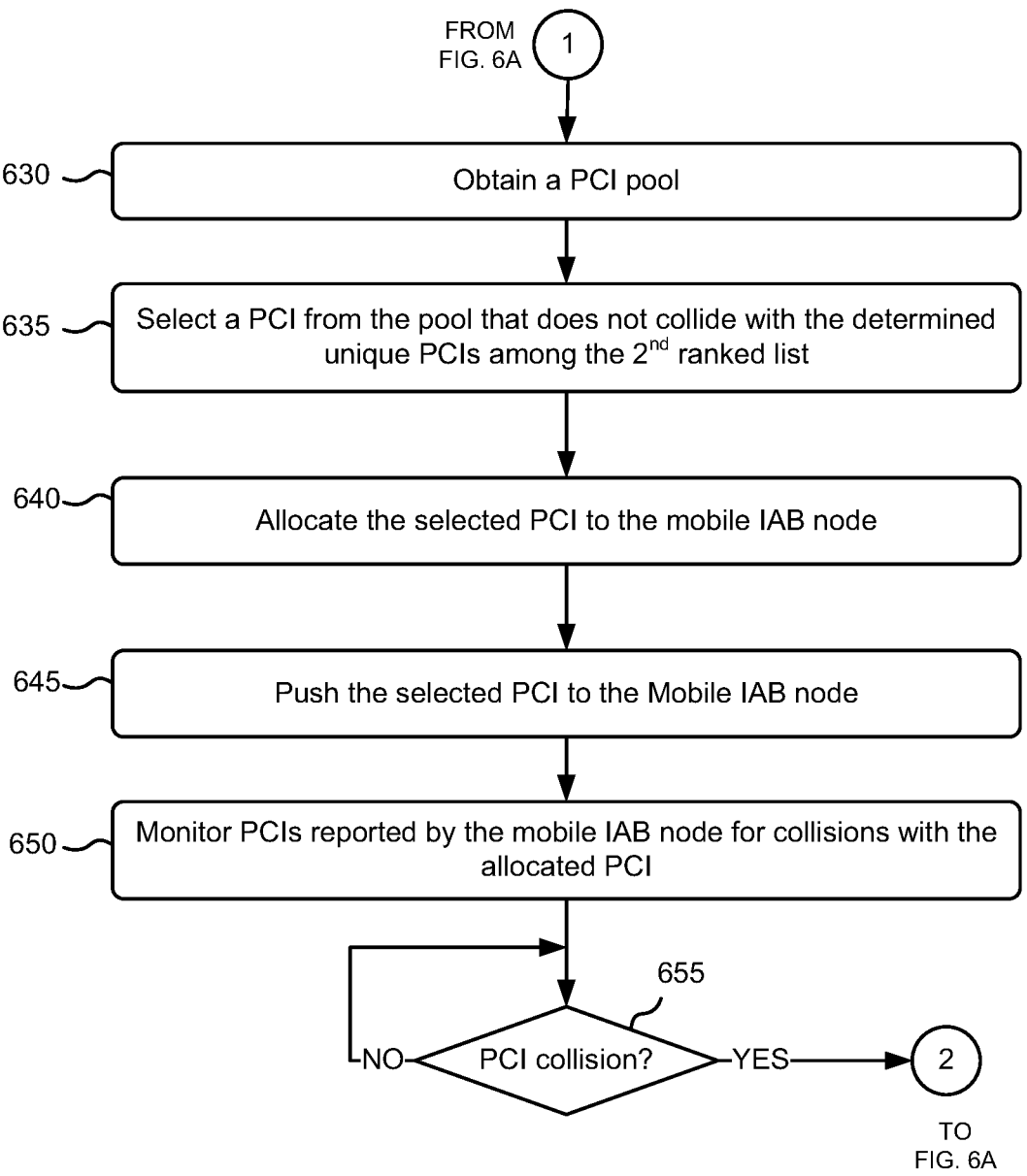

FIGS. 6A and 6B are flow diagrams of an example process for selecting and allocating a non-colliding PCI to a mobile IAB node 145 that may be moving from one geographic location to another geographic location. In one implementation, the example process of FIGS. 6A and 6B may be implemented by PCI management server 120.

The example process includes PCI management server 120 receiving a report of acquired PCIs and measured signal qualities of a mobile IAB node 145's neighboring cells and/or cell sectors (block 600). PCI management server 120 may receive the list of PCIs and measured relative signal qualities generated by the mobile IAB node 145 in block 425 of FIG. 4. The reported list from the mobile IAB node 145 may include, for example, an identification of each neighboring IAB donor DU 210 and/or each IAB node 215, the PCI(s) associated with one or more cells/cell sectors of each neighboring IAB donor DU 210 and/or IAB node 215, and the measured relative signal quality associated with each PCI and corresponding cell/cell sector.

PCI management server 120 obtains a neighbor list of the mobile IAB node 145's parent node and other IAB nodes and/or IAB donor DUs associated with neighboring cells and/or cell sectors (block 605). Referring to the example RAN 130 of FIG. 2, mobile IAB node 145-1 obtains a neighbor list of parent node IAB node 215-1, and neighbor lists from any other IAB nodes 215 or IAB donor DUs 210 having cells/cell sectors whose coverage area extend to mobile IAB node 145-1's current location. Each neighbor list (NL) includes a list of data that identifies neighboring cells/cells sectors, an identification of the DU, IAB node, IAB donor DU, or mobile IAB node) that corresponds to the neighboring cells/cell sectors, and the PCI allocated to each of the neighboring cells/cell sectors. Each NL may additionally include relative signal quality measurements associated with each neighboring cell/cell sector.

PCI management server 120 creates a first ranked list of the mobile IAB node 145's neighboring cells/cell sectors based on relative signal qualities (block 610). PCI management server 120 identifies the relative signal qualities of each neighboring cells/cell sectors, and ranks those signal qualities, along with the PCI of each neighboring cell/cell sector, in descending order from highest relative signal quality to lowest relative signal quality.

PCI management server 120 identifies the n highest ranked neighboring cells/cell sectors and determines the associated IAB node/IAB donor DU (block 615). For example, PCI management server 120 may identify the 10 highest ranked neighboring cells/cells sectors, or the top 20% of the ranked neighboring cells/cell sectors. PCI management server 120 further determines the IAB node or IAB donor DU associated with each of the n highest ranked neighboring cells/cell sectors and identifies the IAB node or IAB donor DU as a "highest ranked site." The set of "highest ranked sites" may, therefore, include m IAB nodes or IAB donor DUs (where m is less than or equal to n) that each has at least one of the n highest ranked neighboring cells/cell sectors.

PCI management server 120 creates a second ranked list based on the acquired PCIs and the neighbor lists of the m highest ranked IAB nodes/IAB donor DUs from the first ranked list (block 620). To create the second ranked list, PCI management server 120 ranks, in descending order by relative signal quality, the following: 1) the mobile IAB node 145's scanned PCIs, 2) the PCIs associated with the neighbor list of the highest ranking site's (of the m IAB nodes or IAB donor DUs of block 615) neighboring cells/cell sectors, and 3) the PCIs associated with the neighbor list of the $2^{nd}$ highest ranking site's (of the m IAB nodes or IAB donor DUs of block 615) neighboring cells/cell sectors.

PCI management server 120 truncates the second ranked list and determines unique PCIs among the truncated list (block 625). PCI management server 120 may, in one implementation, apply a relative signal quality threshold to truncate the second ranked list. For example, PCI management server 120 may drop all PCIs from the second ranked list having relative signal qualities less than signal_quality_threshold_x. PCI management server 120 takes the truncated list and removes all duplicate PCIs in the list to identify the unique PCIs contained in the list. For example, if the truncated list includes the list: {$PCI_1$, $PCI_5$, $PCI_{10}$, $PCI_{25}$, $PCI_5$, $PCI_{52}$, $PCI_{25}$, $PCI_1$}, then a list of all unique PCIs would be the following: {$PCI_1$, $PCI_5$, $PCI_{10}$, $PCI_{25}$, $PCI_{52}$}.

PCI management server 120 obtains a PCI pool (block 630) and selects a PCI from the pool that does not collide with the determined unique PCIs among the second ranked list (block 635). The PCI pool includes a pool of all possible PCIs that can be selected for PCI assignments. PCI management server 120 compares the unique PCIs determined among the truncated list of block 625 with PCIs contained in the PCI pool and selects a PCI from the PCI pool that does not collide with any of the unique PCIs from the truncated list.

PCI management server 120 allocates the selected PCI to the mobile IAB node 145 (block 640) and pushes the selected PCI to the mobile IAB node 145 (block 645). PCI management server 120 stores the association between the mobile IAB node 145 and the allocated PCI in memory, generates a message that identifies the allocated PCI, and sends the message to the mobile IAB node 145 via, for example, the parent node of the mobile IAB node 145.

PCI management server 120 monitors PCIs reported by the mobile IAB node for collisions with the allocated PCI (block 650). If there is a PCI collision between the PCI allocated to the mobile IAB node 145 and PCIs allocated to other mobile IAB nodes, IAB nodes and/or IAB donor DUs (YES—block 655), then the process may return to block 620 with PCI management server 120 re-creating the second ranked list based on the acquired PCIs and the neighbor lists of the m highest ranked IAB nodes/IAB donor DUs from the first ranked list of block 610, and reselecting a non-colliding PCI and allocating the PCI to the mobile IAB node 145. If there is no PCI collision (NO—block 655), then PCI management server 120 repeats block 655 and rechecks whether there is a PCI collision between the PCI allocated to the mobile IAB node 145 and PCIs allocated to other nodes in the mobile network 110 (e.g., another mobile IAB node, an IAB node, or an IAB donor DU).

Figure 7:
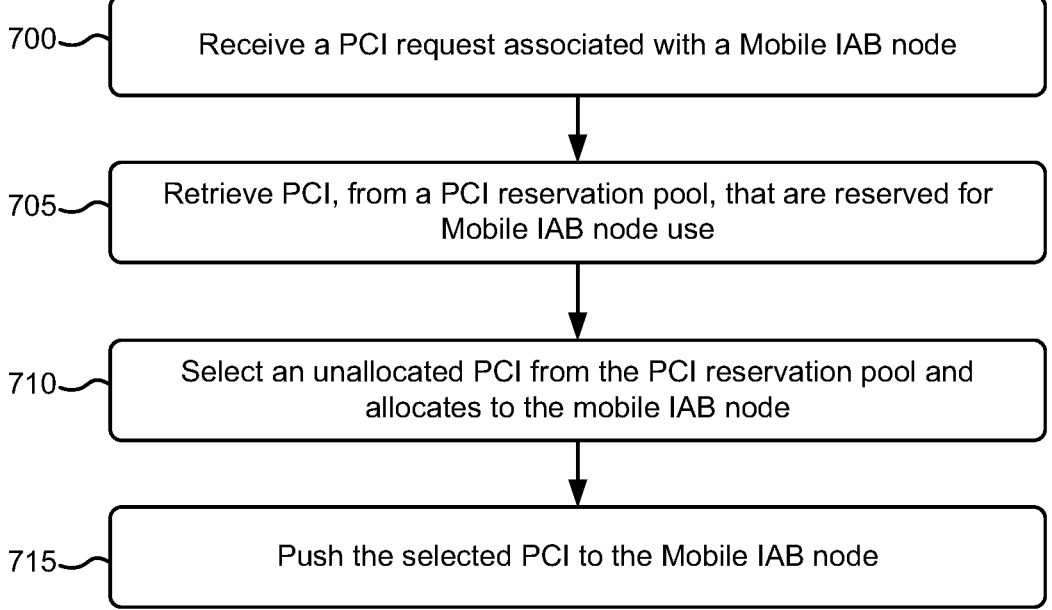
FIG. 7 is a flow diagram of an example process for selecting and allocating a non-colliding PCI to a mobile IAB node from a pool of PCIs reserved for use by mobile IAB nodes.

FIG. 7 is a flow diagram of an example process for selecting and allocating a non-colliding PCI to a mobile IAB node 145 from a pool of PCIs reserved for mobile IAB nodes. In one implementation, the example process of FIG. 7 may be implemented by PCI management server 120.

The example process includes PCI management server 120 receiving a PCI request associated with a mobile IAB node 145 (block 700). The PCI request may be received from the mobile IAB node 145 itself, or from another node in RAN 130 or mobile network 110 on behalf of the mobile IAB node 145. For example, upon power-up at a certain location in RAN 130, the mobile IAB node 145 may send a request for a PCI to RAN 130 which, in turn, may be forwarded to PCI management server 120.

PCI management server 120 retrieves PCIs, from a PCI reservation pool, that are reserved for mobile IAB node use (block 705). PCI management server 120 may maintain a pool of PCIs that are reserved for sole use by mobile IAB nodes. The reserved PCI pool may include PCIs selected from the global PCI pool described above with respect to block 630.

PCI management server 120 selects an unallocated PCI from the PCI reservation pool and allocates the selected PCI to the mobile IAB node 145 (block 710). The PCI selected from the PCI reservation pool may be selected so as to not collide with PCIs allocated to other mobile IAB nodes, IAB nodes, or IAB donor DUs within the vicinity of the mobile IAB node 145. To select a non-colliding PCI, PCI management server 120 compares the PCIs contained in the PCI reservation pool with PCIs allocated to other mobile IAB nodes, IAB nodes, and/or IAB donor DUs within the vicinity of the mobile IAB node 145 to identify non-matching PCIs, and selects one of the non-matching PCIs.

PCI management server 120 pushes the selected PCI to the mobile IAB node 145 (block 715). PCI management server 120 stores the association between the mobile IAB node 145 and the allocated PCI in memory, generates a message that identifies the allocated PCI, and sends the message to the mobile IAB node 145 via, for example, the parent node of the mobile IAB node 145.

Figure 8:
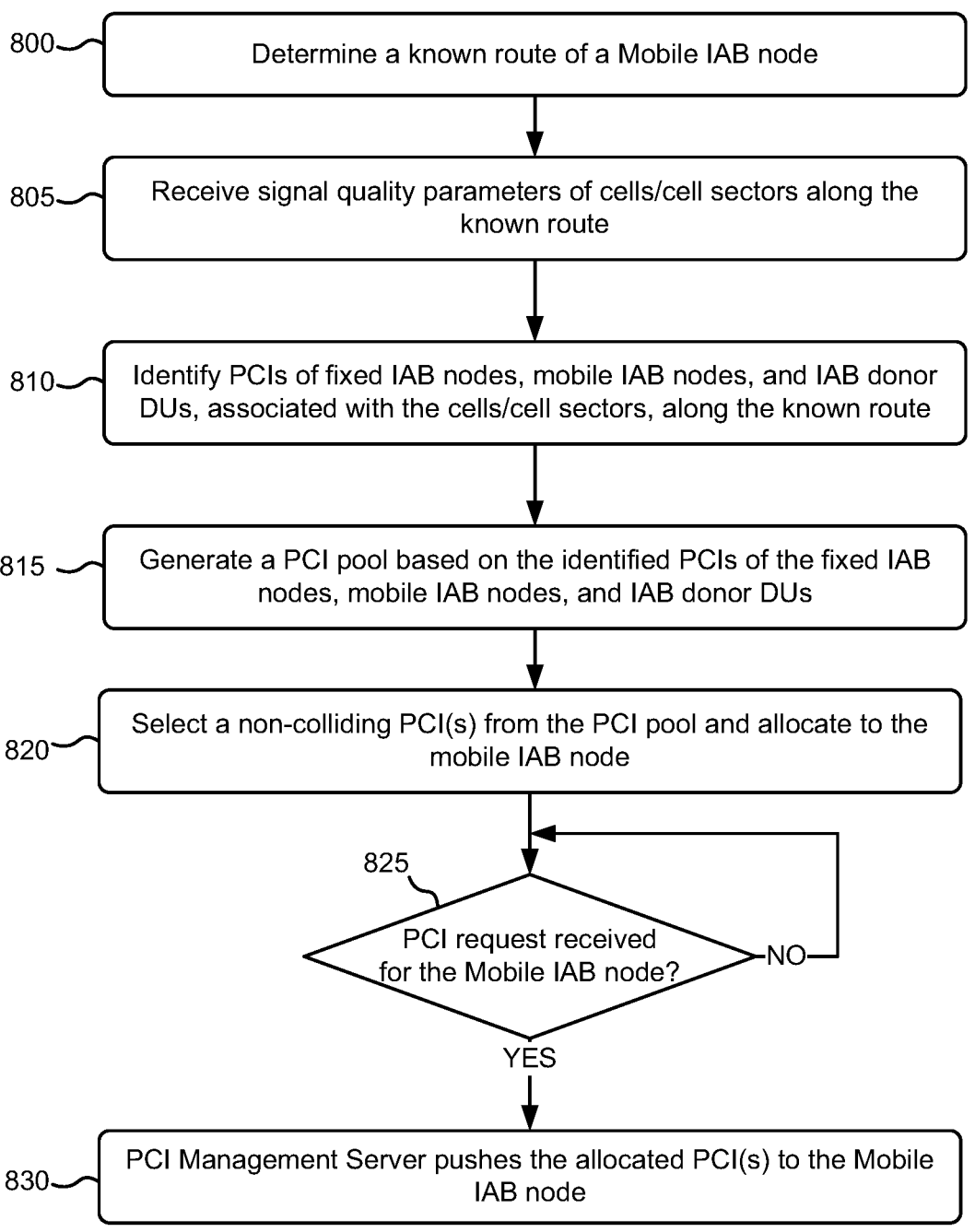
FIG. 8 is a flow diagram of an example process for selecting and allocating one or more non-colliding PCIs to a mobile IAB node whose movement follows a known route.

FIG. 8 is a flow diagram of an example process for selecting and allocating one or more non-colliding PCIs to a mobile IAB node 145 whose movement follows a known route. In one implementation, the example process of FIG. 8 may be implemented by PCI management server 120. The example process of FIG. 8 is described with additional reference to the example portion of RAN 130 shown in FIG. 9.

The example process includes PCI management server 120 determining a known route of a mobile IAB node 145 (block 800). PCI management server 120 may, for example, obtain geolocation data (e.g., Global Positioning System (GPS) data) from mobile IAB node 145 as the node 145 traverses the known route. Additionally, or alternatively, a system operator may upload geolocation data associated with the known route to PCI management server 120. Additionally, or alternatively, PCI management server 120 may retrieve previously stored geolocation data associated with the known route from an Operations, Administration and Management (OAM) system or management platform associated with mobile network 110.

PCI management server 120 receives signal quality parameters of cells/cell sectors along the known route (block 805). PCI management server 120 may, for example, obtain measured signal quality parameters, of neighboring cells/cell sectors, from the mobile IAB node 145 as the mobile IAB node 145 traverses the known route. Additionally, or alternatively, a system operator may upload pre-measured signal quality parameters for neighboring cells/cell sectors along the known route. Additionally, or alternatively, PCI management server 120 may retrieve pre-stored signal quality parameters for the neighboring cells/cell sectors along the known route from an OAM system or management platform associated with mobile network 110.

Figure 9:
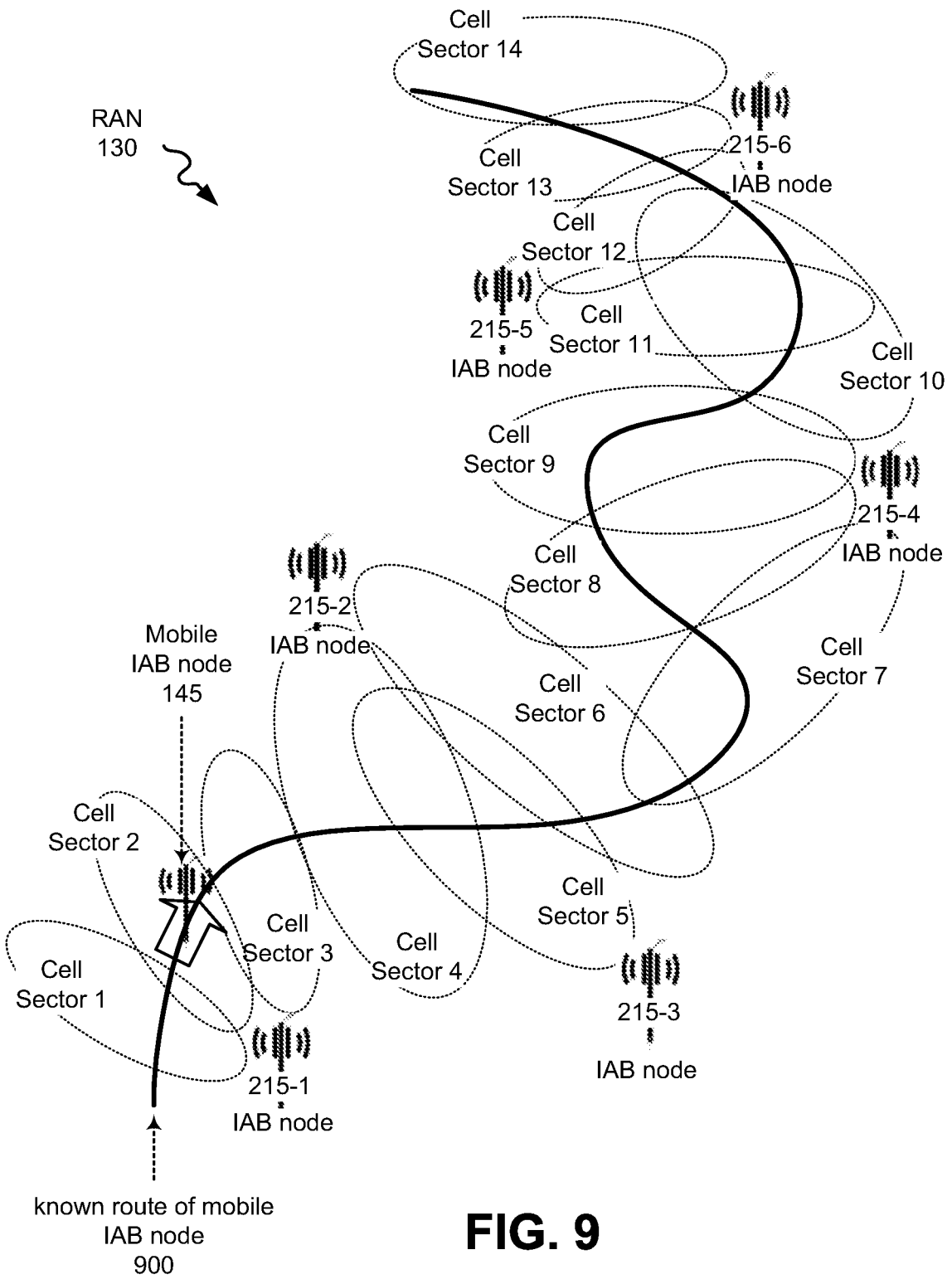
FIG. 9 illustrates an example of a portion of a RAN of a mobile network within which a mobile IAB node follows a known route.

Referring to the example RAN 130 of FIG. 9, a series of cell sectors have RF coverage areas that encompass portions of a known route 900 of a mobile IAB node 145. As shown, cell sectors 1 through 14 each have an RF coverage area that encompasses a different portion of the known route 900 of the mobile IAB node 145. For example, IAB node 215-1 generates cell sectors 1-3, IAB node 215-2 generates cell sectors 4 and 6, IAB node 215-3 generates cell sector 5, IAB node 215-4 generates cell sectors 7-10, IAB node 215-5 generates cell sector 11, and IAB node 215-6 generates cell sectors 12-14.

PCI management server 120 identifies PCIs of fixed IAB nodes, mobile IAB nodes, and IAB donor DUs, associated with the neighboring cells/cell sectors, along the known route (block 810). For example, PCI management server 120 may store a database that maps cells/cell sectors, and their PCIs, to the fixed IAB nodes, mobile IAB nodes, or IAB donor DUs that are responsible for each of the cells/cell sectors. PCI management server 120 may obtain the PCIs of the neighboring cells/cell sectors that exist along the known route. For example, PCI management server 120 may map cell sectors 1-3 to IAB node 215-1, cell sectors 4 and 6 to IAB node 215-2, cell sector 5 to IAB node 215-3, cell sectors 7-10 to IAB node 215-4, cell sector 11 to IAB node 215-5, and cell sectors 12-14 to IAB node 215-6. PCI management server 120 may further map cell sectors 1, 2, and 3 to respective PCIs $PCI_1$, $PCI_2$, and $PCI_3$, cell sectors 4 and 6 to respective PCIs $PCI_4$ and $PCI_6$, cell sector 5 to $PCI_5$, cell sectors 7, 8, 9, and 10 to PCIs $PCI_7$, $PCI_8$, $PCI_9$ and $PCI_{10}$, and cell sectors 12, 13 and 14 to PCIs $PCI_{12}$, $PCI_{13}$, and $PCI_{14}$.

PCI management server 120 generates a PCI pool based on the identified PCIs of the fixed IAB nodes, mobile IAB nodes, and IAB donor DUs (block 815). PCI management server 120 obtains the global PCI pool described above with respect to block 630, and compares the PCIs of the fixed IAB nodes, mobile IAB nodes, and IAB donor DUs along the known route with the PCIs in the global PCI pool. Matching PCIs within the global PCI pool are removed to create a resulting set of PCIs, and PCI management server 120 identifies the resulting set of PCIs as the PCI pool of block 815.

PCI management server 120 selects a non-colliding PCI (s) from the PCI pool and allocates to the mobile IAB node 145 (block 820). PCI management server 120 may select one or more PCIs from the PCI pool for allocation to the mobile IAB node 145 for use along the known route. PCI management server 120, when selecting the one or more PCIs from the PCI pool, minimizes the number of changes to the PCI of the mobile IAB node 145 as the mobile IAB node 145 traverses its known route, while at the same time avoiding PCI collisions with neighboring cells/cell sectors along the known route.

PCI management server 120 determines if a PCI request has been received for the mobile IAB node 145 (block 825). The mobile IAB node 145 itself, or another node or device in RAN 130 or core network 135 may request a PCI on behalf of the mobile IAB node 145. When a PCI request is received for the mobile IAB node 145 (YES—block 825), then PCI management server 120 pushes the allocated PCI(s) to the mobile IAB node 145 (block 830). PCI management server 120 stores the association between the mobile IAB node 145 and the allocated one or more PCIs in memory, generates a message that identifies the allocated PCI(s), and sends the message to the mobile IAB node 145 via, for example, the parent node of the mobile IAB node 145.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 6A, 6B, 7, and 8, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
obtaining a Physical Layer Cell Identifier (PCI) pool of possible PCIs that can be selected for PCI assignment;
obtaining PCIs allocated to the cells or cell sectors that neighbor a mobile Integrated Access and Backhaul (IAB) node;
ranking, by relative signal quality, the cells or cell sectors that neighbor the mobile IAB node to create a first ranked list;
determining IAB nodes or IAB donor Distributed Units (DUs) associated with n highest ranked cells or cell sectors from the first ranked list;
obtaining neighbor lists associated with the mobile IAB node's parent node, and at least one of other IAB nodes or IAB donor DUs that are further associated with the cells or cell sectors that neighbor the mobile IAB node;
creating a second ranked list based on the first ranked list, the determined IAB nodes or IAB donor DUs, the obtained neighbor lists, and the obtained PCIs allocated to the cells or cell sectors that neighbor the mobile IAB node;
determining PCIs associated with at least a portion of the second ranked list;
selecting a PCI from the PCI pool that does not match any of the determined PCIs associated with the at least a portion of the second ranked list; and
pushing the selected PCI to the mobile IAB node for use by the mobile IAB node for establishing User Equipment (UE) wireless access to a wireless network via wireless backhaul.

2. The method of claim 1, wherein the mobile IAB node comprises a node having functionality for radio frequency (RF) communication with UEs and wireless backhaul communication with other IAB nodes or IAB donor DUs of the wireless network.

3. The method of claim 1, further comprising:
receiving a report containing a list of the obtained PCIs and measured relative signal qualities of the cells or cell sectors that neighbor the mobile IAB node,
wherein creating the second ranked list is further based on the list of acquired PCIs and measured relative signal qualities.

4. The method of claim 1, wherein creating the second ranked list further comprises:
identifying a first IAB node or IAB donor DU as being associated with a highest ranked cell or cell sector of the n highest ranked neighboring cells or cell sectors;
obtaining, from the obtained neighbor lists, a first neighbor list associated with the first IAB node or IAB donor DU;
identifying a second IAB node or IAB donor DU as being associated with a second highest ranked cell or cell sector of the n highest ranked cells or cell sectors;
obtaining, from the obtained neighbor lists, a second neighbor list associated with the second IAB node or IAB donor DU; and
ranking, by relative signal quality, PCIs associated with the first neighbor list and the second neighbor list to create the second ranked list.

5. The method of claim 1, further comprising:
applying a signal quality threshold to the second ranked list to create a truncated second ranked list,
wherein determining the PCIs comprises:
determining unique PCIs associated with the truncated second ranked list, and wherein selecting the PCI from the PCI pool comprises:
selecting the PCI from the PCI pool that does not match any of the determined unique PCIs associated with the truncated second ranked list.

6. The method of claim 1, wherein determining the PCIs associated with at least a portion of the second ranked list further comprises:
removing duplicate PCIs from the determined PCIs associated with the least a portion of the second ranked list to determine unique PCIs, and
wherein selecting the PCI from the PCI pool comprises:
selecting the PCI from the PCI pool that does not match any of the determined unique PCIs.

7. The method of claim 1, wherein creating the second ranked list further comprises:
identifying a first IAB node or IAB donor DU as being associated with a highest ranked cell or cell sector of the n highest ranked neighboring cells or cell sectors;
obtaining, from the obtained neighbor lists, a first neighbor list associated with the first IAB node or IAB donor DU; and
ranking, by relative signal quality, PCIs associated with the first neighbor list to create the second ranked list.

8. A network device, comprising:
at least one communication interface; and
at least one processor configured to:
obtain a Physical Layer Cell Identifier (PCI) pool for of possible PCIs that can be selected for PCI assignment;
obtain PCIs allocated to the cells or cell sectors that neighbor a mobile Integrated Access and Backhaul (IAB) node;
rank, by relative signal quality, the cells or cell sectors that neighbor the mobile IAB node to create a first ranked list;
determine IAB nodes or IAB donor Distributed Units (DUs) associated with n highest ranked cells or cell sectors from the first ranked list;
obtain neighbor lists associated with the mobile IAB node's parent node, and at least one of other IAB nodes or IAB donor DUs that are further associated with cells or cell sectors that neighbor the mobile IAB node;

create a second ranked list based on the first ranked list, the determined IAB nodes or IAB donor DUs, the obtained neighbor lists, and the obtained PCIs allocated to the cells or cell sectors that neighbor the mobile IAB node;

determine PCIs associated with at least a portion of the second ranked list;

select a PCI from the PCI pool that does not match any of the determined PCIs associated with the at least a portion of the second ranked list; and push, via the at least one communication interface, the selected PCI to the mobile IAB node for use by the mobile IAB node for establishing User Equipment (UE) wireless access to a wireless network via wireless backhaul.

9. The network device of claim 8, wherein the mobile IAB node comprises a node having functionality for radio frequency (RF) communication with UEs and wireless backhaul communication with other IAB nodes or IAB donor DUs of the wireless network.

10. The network device of claim 8, where the at least one communication interface is configured to:

receive a report containing a list of the obtained PCIs and measured relative signal qualities of the cells or cell sectors that neighbor the mobile IAB node, and wherein, when creating the second ranked list, the at least one processor is further configured to:

create the second ranked list is further based on the measured relative signal qualities.

11. The network device of claim 8, wherein, when creating the second ranked list, the at least one processor is further configured to:

identify a first IAB node or IAB donor DU as being associated with a highest ranked cell or cell sector of the n highest ranked neighboring cells or cell sectors;

obtain, from the obtained neighbor lists, a first neighbor list associated with the first IAB node or IAB donor DU;

identify a second IAB node or IAB donor DU as being associated with a second highest ranked cell or cell sector of the n highest ranked cells or cell sectors;

obtain, from the obtained neighbor lists, a second neighbor list associated with the second IAB node or IAB donor DU; and rank, by relative signal quality, PCIs associated with the first neighbor list and the second neighbor list to create the second ranked list.

12. The network device of claim 8, wherein the at least one processor is further configured to:

apply a signal quality threshold to the second ranked list to create a truncated second ranked list, wherein, when determining the PCIs, the at least one processor is configured to:

determine unique PCIs associated with the truncated second ranked list, and wherein, when selecting the PCI from the PCI pool, the at least one processor is configured to:

select the PCI from the PCI pool that does not match any of the determined unique PCIs associated with the truncated second ranked list.

13. The network device of claim 8, wherein, when determining the PCIs associated with at least a portion of the second ranked list, the at least one processor is configured to:

remove duplicate PCIs from the determined PCIs associated with the least a portion of the second ranked list to determine unique PCIs, and

wherein, when selecting the PCI from the PCI pool, the at least one processor is configured to:

select the PCI from the PCI pool that does not match any of the determined unique PCIs.

14. The network device of claim 8, wherein, when creating the second ranked list, the at least one processor is further configured to:

identify a first IAB node or IAB donor DU as being associated with a highest ranked cell or cell sector of the n highest ranked neighboring cells or cell sectors;

obtain, from the obtained neighbor lists, a first neighbor list associated with the first IAB node or IAB donor DU; and rank, by relative signal quality, PCIs associated with the first neighbor list to create the second ranked list.

15. A non-transitory storage medium storing instructions executable by a network device, wherein the instructions comprise instructions to cause the network device to:

obtain a Physical Layer Cell Identifier (PCI) pool of possible PCIs that can be selected for PCI assignment;

obtain PCIs allocated to the cells or cell sectors that neighbor a mobile Integrated Access and Backhaul (IAB) node;

rank, by relative signal quality, the cells or cell sectors that neighbor the mobile IAB node to create a first ranked list;

determine IAB nodes or IAB donor Distributed Units (DUs) associated with n highest ranked cells or cell sectors from the first ranked list;

obtain neighbor lists associated with the mobile IAB node's parent node, and at least one of other IAB nodes or IAB donor DUs that are further associated with cells or cell sectors that neighbor the mobile IAB node;

create a second ranked list based on the first ranked list, the determined IAB nodes or IAB donor DUs, the obtained neighbor lists, and the obtained PCIs allocated to the cells or cell sectors that neighbor the mobile IAB node;

determine PCIs associated with at least a portion of the second ranked list;

select a PCI from the PCI pool that does not match any of the determined PCIs associated with the at least a portion of the second ranked list; and push the selected PCI to the mobile IAB node for use by the mobile IAB node for establishing User Equipment (UE) wireless access to a wireless network via wireless backhaul.

16. The non-transitory storage medium of claim 15, further comprising instructions to cause the network device to:

receive a report containing a list of the obtained PCIs and measured relative signal qualities of the cells or cell sectors that neighbor the mobile IAB node, wherein creating the second ranked list is further based on the list of acquired PCIs and measured relative signal qualities.

17. The non-transitory storage medium of claim 15, wherein the instructions to cause the network device to create the second ranked list further comprises instructions to cause the network device to:

identify a first IAB node or IAB donor DU as being associated with a highest ranked cell or cell sector of the n highest ranked neighboring cells or cell sectors;

obtain, from the obtained neighbor lists, a first neighbor list associated with the first IAB node or IAB donor DU;

identify a second IAB node or IAB donor DU as being associated with a second highest ranked cell or cell sector of the n highest ranked cells or cell sectors;

obtain, from the obtained neighbor lists, a second neighbor list associated with the second IAB node or IAB donor DU; and rank, by relative signal quality, PCIs associated with the first neighbor list and the second neighbor list to create the second ranked list.

18. The non-transitory storage medium of claim 15, further comprising instructions to cause the network device to:

apply a signal quality threshold to the second ranked list to create a truncated second ranked list, wherein the instructions to cause the network device to determine the PCIs further comprises instructions to cause the network device to:

determine unique PCIs associated with the truncated second ranked list, and wherein the instructions to cause the network device to select the PCI from the PCI pool further comprises instructions to cause the network device to:

select the PCI from the PCI pool that does not match any of the determined unique PCIs associated with the truncated second ranked list.

19. The non-transitory storage medium of claim 15, wherein the instructions to cause the network device to determine the PCIs associated with at least a portion of the second ranked list further comprise instructions to cause the network device to:

remove duplicate PCIs from the determined PCIs associated with the least a portion of the second ranked list to determine unique PCIs, and wherein the instructions to cause the network device to select the PCI from the PCI pool further comprise instructions to cause the network device to:

select the PCI from the PCI pool that does not match any of the determined unique PCIs.

20. The non-transitory storage medium of claim 15, wherein the instructions to cause the network device to create the second ranked list further comprises instructions to cause the network device to:

identify a first IAB node or IAB donor DU as being associated with a highest ranked cell or cell sector of the n highest ranked neighboring cells or cell sectors;

obtain, from the obtained neighbor lists, a first neighbor list associated with the first IAB node or IAB donor DU; and rank, by relative signal quality, PCIs associated with the first neighbor list to create the second ranked list.

* * * * *